July 27, 1954 W. H. KEITER 2,684,661
VALVE MECHANISM
Filed Dec. 8, 1952 2 Sheets-Sheet 1
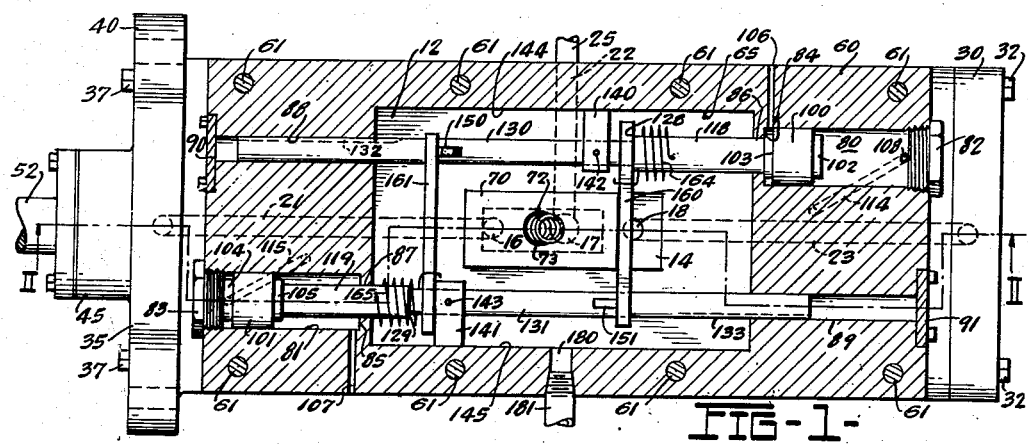
FIG-1-
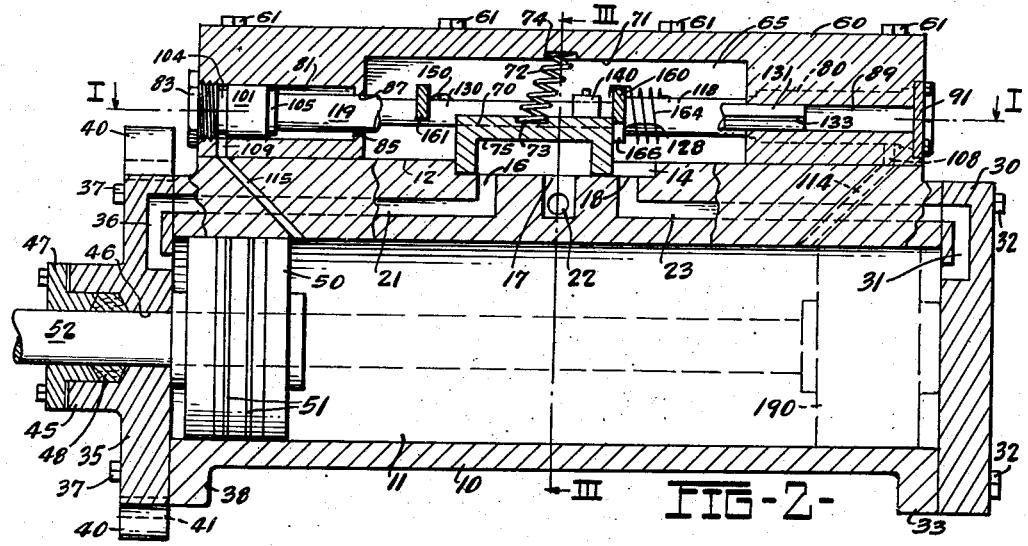
FIG-2-
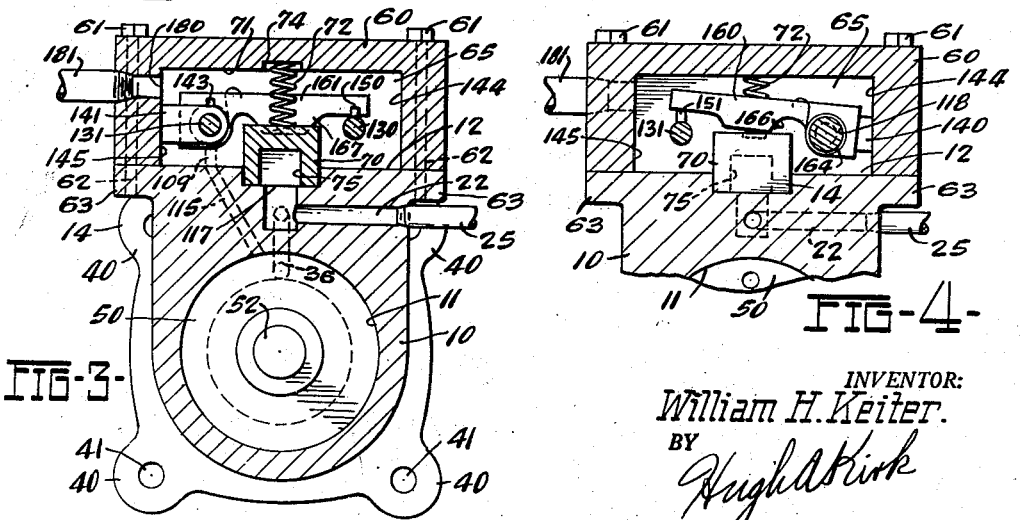
FIG-3- FIG-4-
INVENTOR:
William H. Keiter.
BY
Hugh A Kirk
ATTY.

July 27, 1954
W. H. KEITER
2,684,661
VALVE MECHANISM
Filed Dec. 8, 1952
2 Sheets-Sheet 2
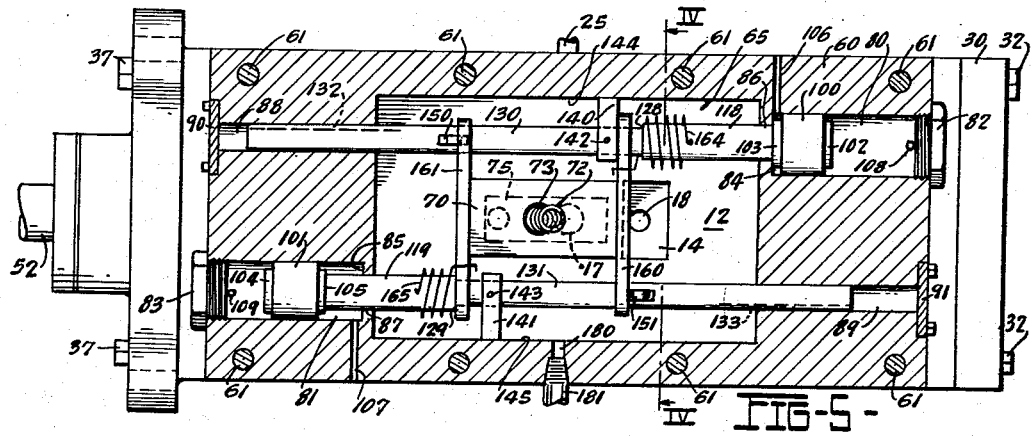
FIG-5-
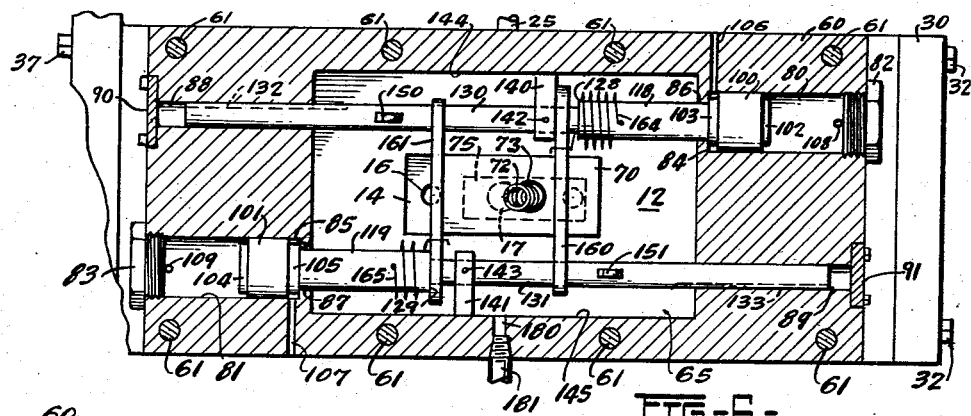
FIG-6-
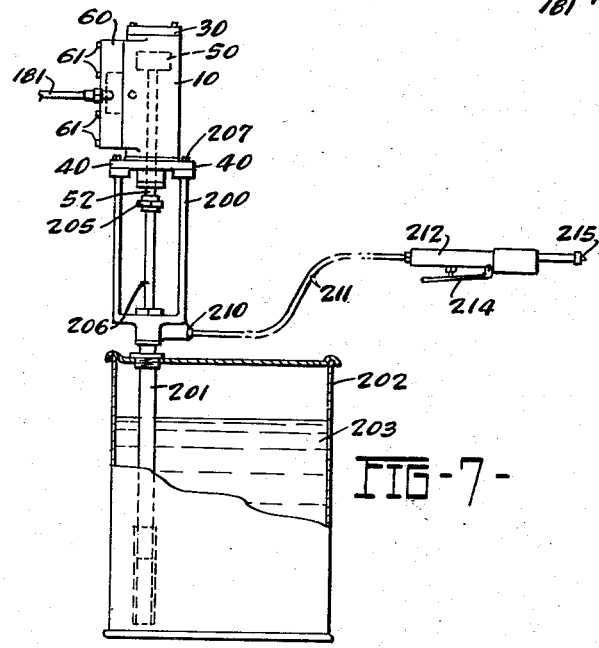
FIG-7-
INVENTOR:
William H. Keiter.
BY
Hugh A Kirk
ATTY.

Patented July 27, 1954

2,684,661

UNITED STATES PATENT OFFICE 2,684,661

VALVE MECHANISM

William H. Keiter, Toledo, Ohio

Application December 8, 1952, Serial No. 324,645

11 Claims. (Cl. 121—150)

This invention relates to a valve mechanism for controlling the reciprocations of an expansible chamber motor. More particularly it deals with an automatic fluid controlled D-type valve for controlling the reciprocations of a piston in a cylinder, such as for example, a piston motor for a reciprocating type of grease pump which pump is connected to a grease gun where a constant pressure behind the gun is required at all times whether the gun is being operated or not.

It is an object of this invention to produce a simple, efficient, effective and economic valve mechanism for a reciprocating expansible chamber motor.

Another object is to produce an automatic fluid controlled valve mechanism for a reciprocating expansible chamber motor which maintains a constant pressure of fluid against the piston in the reciprocating motor at all times, whether or not the piston is continuously or intermittently operated even for a part of a stroke.

Another object is to produce such a valve mechanism which may be readily adapted to any D-type valve controlled reciprocating expansible chamber motor without the necessity of providing a special piston or a special cylinder for the valve mechanism.

Another object is to provide such a valve mechanism which may be used for operating grease or sealing compound pumps such as used along the automobile assembly lines.

Another object is to provide a valve control mechanism for a reciprocating expansible chamber motor which does not have any exposed mechanically moving parts or cams which will wear or which can be maladjusted by inexperienced operators.

Another object is to provide such a valve mechanism which may be adapted to a reciprocating motor for a grease type of pump, the piston of which motor need not be integral with the pump piston so that the motor and valve mechanism may be readily disconnected from the pump, if desired, for purposes of adjustment and repair.

Another object is to provide a valve mechanism for a reciprocating expansible chamber motor which may be adapted for pumps having any effective motor to pump pressure ratios, such as from about 5:1 to 80 to 1, and reciprocation speeds from less than one per minute to more than one per second.

Generally speaking, the valve mechanism according to this invention is adapted to control the common type of reciprocating, sliding or D-valve employed in controlling the reciprocations of a piston in a cylinder responsive to fluid pressures. This mechanism comprises a fluid pressure box or chest in which a fluid, such as steam or compressed air, is maintained at a constant pressure over and around a D-valve. The D-valve alternately connects one end of the cylinder to the pressure in the chest and the other end of the cylinder to the exhaust, and vice versa, as it is slid back and forth over two of three adjacent openings or ports in series along a side of the chest. The mechanism of this invention comprises a pair of control pistons mounted in the chest, one on each side of the D-valve, which control pistons are provided with pivoted arms that push against opposite ends of the D-valve to move it from one of its positions or stations to another. In order to prevent the two control pistons in the chest from simultaneously pushing against each other and deadlocking their movements, cams are provided on each of the control piston rods, which together with the action of a spring move the pivoted engaging arm of one of the control pistons out of stopping engagement with the D-valve when the other control piston arm is in operative position and is moving or holding the D-valve in one of its positions or stations. These two control pistons are operated by the pressure from the main motor cylinder itself and the pressure in the chest. To maintain the D-valve in either one of its positions while the control pistons are changing engagement with the D-valve, an additional resilient means may be provided which operates between the chest wall and the D-valve itself.

The above mentioned and other features and objects of this invention and the manner of attaining them are given more specific disclosure in the following description of an embodiment of this invention taken in conjunction with the accompanying drawings, wherein:

Fig. 1 is a sectional plan view of one embodiment of the valve mechanism of this invention in a fluid pressure chest for controlling a reciprocating expansible chamber motor;

Fig. 2 is a vertical section along lines II—II of Fig. 1 showing the mechanism as it is attached to a motor having a cylinder and a reciprocating piston therein, with one position of the piston being shown in dotted lines;

Fig. 3 is a vertical section along line III—III of Fig. 2;

Fig. 4 is a similar section to Fig. 3 with part of the cylinder broken away, but showing a pivoted lever arm on a control piston of the valve mechanism in the chest, cammed out of engagement with the D-valve, or a vertical section along line IV—IV of Fig. 5;

Fig. 5 is a view similar to Fig. 1 showing one pivoted lever arm on one control piston in D-valve abutting position, and the other pivoted lever arm on the other control piston in disengagement with the D-valve as in Fig. 4;

Fig. 6 is similar to Fig. 5 showing the D-valve in the opposite position from that shown in Fig. 1;

Fig. 7 is a side elevation of a lubricating system including a reciprocating motor with a valve mechanism according to this invention, together with a grease pump in a reservoir or barrel and a grease gun.

I. THE DESCRIPTION OF THE APPARATUS

1. *The reciprocating expansible chamber motor*

Referring to Figs. 1, 2 and 3 on the first sheet of drawings, the reciprocating expansible chamber motor to which the present valve mechanism of this invention is applied comprises by way of example a motor cylinder housing 10 provided with a cylindrical chamber 11 and a flat machined outer surface 12 to which a chest containing the valve mechanism may be attached, and in which surface may be provided a rectangular recessed portion 14 in which the D-valve mechanism slides. Equally spaced longitudinally along the center of the bottom of the recessed portion 14 may be three ports or openings 16, 17 and 18 which communicate respectively with ducts 21, 22 and 23 in the cylinder block or housing 10. The central opening 17 may be larger than the other two openings 16 and 18, and it is continuously covered by the D-valve mechanism since it communicates through duct 22 which may be open to the atmosphere or connected to an exhaust pipe 25. In the embodiment shown, the ducts 21 and 23 from the ports 16 and 18, respectively, extend longitudinally through the housing 10 to the opposite ends of the cylinder block.

One end of the cylinder, the right end shown in the drawings, may be provided with a head plate 30 and an internal U-shaped duct 31 (see Fig. 2) which connects the end of the duct 23 to the end of the chamber 11 of the cylinder, thereby connecting the expansible chamber through the ducts 31 and 23 with the chest of the valve mechanism mounted on the cylinder. This head plate 30 may be fastened to the end of the cylinder by any suitable means such as bolts 32 which may be tapped into the flange 33 provided at the corresponding end of the cylinder housing 10. The other end of the cylinder housing 10 may be capped by an apertured plate or head 35 provided with an internal U-shaped duct 36 similar to the duct 31, which communicates with the duct 21 in the cylinder housing 10 thereby connecting the other end of the cylinder chamber 11 with the chest of the valve mechanism. Bolts 37, similar to bolts 32, may be provided for attaching this head 35 to the other end of the cylinder housing 10, which bolts 37 enter into tapped holes in a flange 38, similar to the flange 33, of the cylinder housing 10. This head 35 may also be provided with outwardly extending flanges or portions 40, provided with apertures 41 by means of which flanges the whole motor and valve mechanism assembly may be mounted or supported onto a suitable bracket, such as for example shown in Fig. 7. The central portion of the head 35 is provided with a cylindrical boss 45 surrounding a central aperture 46 through which a piston rod may slide. To the end of the boss 45 may be bolted a clamping sleeve 47 for maintaining a suitable stuffing or packing material 48 to form a fluid tight joint between a piston rod and the aperture 46 in the head 35.

Reciprocating in the chamber 11 is provided a main or motor piston 50 which may also be provided with piston rings 51. The piston may be fastened to the end of a piston rod 52 which extends through the aperture 46 in the head 35 and is permitted to slide through the head a distance corresponding to the length of the cylinder chamber 11.

2. *The D-valve chest*

Mounted on the flat portion of the cylinder housing 10 is a valve chest 60 which may be fastened to the flat portion 12 by means of bolts such as 61 cooperating with tapped holes 62 in the flange portion 63 (see Fig. 3) of the cylinder housing 10. The chest 60 is provided with an interior chamber 65 open at the one side which contacts the surface 12, which open side is substantially greater than the recessed portion 14 in the top of the cylinder housing 10. Within the chamber 65 and slidable from end to end of the recess 14, is a D-valve 70 which is spaced below the ceiling 71 of the chamber 65 a sufficient distance to provide operative space for a resilient means 72, such as a helical compression spring which maintains the D-valve at either one end or the other end of its slide path in the recess 14. There may be provided both in the top of the D-valve 70 and in the surface 71 recesses 73 and 74, respectively, in which the ends of spring 72 seat. As shown in the drawing, the D-valve 70 is cup-shaped with a chamber 75 of sufficient length and depth for connecting the two of the ports 16 and 17 or 17 and 18 and not all three of said ports. The length of the D-valve 70 is thus shorter than the recess 14 but of the same width so that the D-valve may slide from one end to the other of the recess 14 and at either end it will expose to the chamber 65 of the chest 60, either one or the other of the ports 16 or 18, while connecting the other port 18 or 16, respectively, through the chamber 75 in the D-valve 70 with the exhaust port 17. The spring 72 pressing between its seats 72 and 74 maintains the D-valve in either of its end positions, since the seat 74 is mounted centrally of the two positions for the D-valve, so that the spring 72 is biased either to one side or the other of the center line between the recess 74 and the exhaust port 17.

The detailed description to this point, except possibly for the addition of spring 72 is conventional for all slow acting reciprocating expansible chamber motors of the piston and cylinder type. Accordingly the valve mechanism of this invention, which description will follow, can be readily adapted to the conventional type of D-valve controlled reciprocating expansible chamber type motor without requiring a new design for the cylinder or for the D-valve provided for controlling the reciprocation of the piston in the cylinder. The following description is now related to the new features of the valve mechanism which are the essential elements of the present invention.

3. *Automatic D-valve control mechanism*

The particular chest 60 shown in the present embodiment of this invention comprises a central rectangular chamber 65 having at each end a control cylinder 80 and 81, each control cylinder being parallel with the slide path of the D-valve and on opposite sides of the D-valve. Herein these control cylinders may be drilled into solid portions in the chest block at each end of the chamber 65, and have diagonally their outer ends capped with plugs 82 and 83, respectively, acting as cylinder heads. These cylindrical holes stop or may be drilled short of the edge of the chamber 65 to provide shoulders 84 and 85, and then holes or apertures 86 and 87 of reduced diameter, axially with the control cylinders 80 and 81, may extend through to the chamber 65. Aligned with each of the axes of the control cylinders 80 and 81 at the opposite ends of the chamber 65 may be control piston guides such as smaller holes 88 and 89 which may pass clear through the housing block 60 and be closed by suitable plate members 90 and 91, respectively.

Mounted in each control cylinder 80 and 81 is valve control pistons 100 and 101 which are limited from contacting the ends of the cylinders 80 and 81 by reduced diameter abutments 102 and 103, one at each end of piston 100, and similar abutments 104 and 105 one at each end of piston 101. The abutments 103 and 105 thus contact the shoulders 84 and 85 so that the pistons 100 and 101 will not close exhaust ducts 106 and 107, respectively, at the inner end of the cylinders 80 and 81. These exhaust ducts 106 and 107 may be open to the atmosphere and permit unrestricted movement of the control pistons 100 and 101. The other abutments 102 and 104 at the opposite ends of the pistons 100 and 101 may contact the ends of the plugs 82 and 83, respectively, so that the pistons 100 and 101 will not close the inlet ducts 108 and 109 which ducts may be drilled radially outwardly from the cylinders 80 and 81 to the surface of chest 60 engaging the flat surface 12 of the cylindrical housing 10.

Cooperating with the open outer ends of the ducts 108 and 109 there are provided an additional pair of ducts 114 and 115 which may be drilled at an angle into the main cylinder housing 10 so that they will open into the main chamber 11 of the cylinder just behind the piston 50 when it is at the corresponding end of the cylinder, as shown in Fig. 2. These ducts 114 and 115 thus connect the outer ends of the control cylinders 80 and 81 for the D-valve control mechanism with the chamber 11 of the reciprocating motor, so that said D-valve control pistons are controlled by the pressure in the main cylinder chamber 11. Thus the drilled ducts 114 and 115 are the only changes which need be made in a standard cylinder housing for a reciprocating expansible chamber motor of the type above described for which the present valve mechanism of this invention is adapted.

Inwardly from the control pistons 100 and 101 are reduced piston sections 118 and 119 of smaller diameter than the abutments 104 and 105, which sections 118 and 119 extend through the reduced apertures 86 and 87 at the inner ends of the cylinders 80 and 81 communicating with the chamber 65. It is desirable that the fit between the control pistons 100 and 101 and their chambers 80 and 81 be as snug as possible and still permit easy sliding, as well as the fit between the reduced piston sections 118 and 119 and their corresponding apertures 86 and 87, so as to prevent as much fluid leakage as possible. The length of the sections 118 and 119 should be a little longer than the distance of the stroke of the pistons 100 and 101 in the cylinders 80 and 81, so as to provide sufficient space for the mounting of the remaining part of the valve control mechanism connected to these pistons.

Extending axially inwardly from the shoulders 128 and 129 at the end of the reduced portions 118 and 119, are control piston rods 130 and 131 of still further reduced diameter, which rods may extend the remainder of the length across the chamber 65 and into the guide holes 88 and 89, respectively, at the opposite ends of the chest 60 for a distance greater than the length of the stroke of said pistons. For a distance greater than the depth of the guide holes 88 and 89, the piston rods 130 and 131 have longitudinal slots 132 and 133 extending from their ends so that the pressure of the fluid in the chest 65 will be the same inside the holes 88 and 89 as in the chest and no restriction of movement of said pistons will occur due to compression or expansion of fluid in the end portion of the holes 88 and 89.

Spaced from the shoulders 128 and 129 between the ends of the control piston sections 118 and 119 and the control piston rods 130 and 131, are slide guide collars 140 and 141, respectively, which are keyed to the piston rods 130 and 131, such as by means of pins 142 and 143. These guide collars slide along the sides 144 and 145, respectively, of the side walls of chamber 65 as shown in Figs. 1, 3, 4, 5 and 6, so as to prevent turning of the pistons and piston rods 130 and 131, as well as to prevent any bending of the rods in the chamber 65.

Spaced from the collars 140 and 141 and extending lengthwise along the rods 130 and 131 are parallel cams 150 and 151 which project above the upper surfaces of the rods 130 and 131 so as to cooperate with the ends of the pivoted lever arms 160 and 161, pivoted on the rods 130 and 131 between the guide members 140 and 141 and the shoulders of the end of the reduced sections 118 and 119 of the control pistons, respectively. These cams 150 and 151 have a length about equal to the space between these shoulders 128 and 129 and the guide collar 140 and 141 and have ends sloping toward the upper surface of said rods along which the ends of the levers 160 and 161 may easily ride. The height of the cams 150 and 151 is sufficient to lift the arms 160 and 161 clear of the top of the D-valve 70 as will be described later and as shown in Fig. 4.

The lever arms 160 and 161 pivoted, respectively, on the piston rods 130 and 131, are permitted slight axial movement along the length of the piston rods between the shoulder 128 and collar 140 along the rod 130, and between the shoulder 129 and the collar 141 along the rod 131. The levers 160 and 161 may be urged toward the stops 140 and 141 by means of helical springs 164 and 165, one end of which springs may be anchored in a hole or suitable aperture in the piston sections 118 and 119, and the other end of which springs may be bent over the top of the lever arms 160 and 161, respectively. These springs thereby not only urge the lever arms 160 and 161 away from the shoulders 128 and 129 and against collars 140 and 141, but also maintain the lever arms 160 and 161 riding along and in contact with upper surfaces and cams 150 and 151 on the piston rods 131 and 130, respectively. Thus the lever arms 160 and 161 extend across the substantial width of the chamber 65 from one parallel control piston rod to the other. Intermediate of the lever arms 160 and 161 there may be dependent sections 166 and 167 (see Figs. 3 and 4), respectively, which engage opposite ends of the D-valve 70, so that as the pistons 100 and 101 are moved they will also move the D-valve 70, as will be described below in the operation of this device. The helical springs 164 and 165 are anchored into the piston sections 118 and 119 at a distance sufficient from the abutments 103 and 105, so as not to hit against the end side of the chamber 65, when said piston sections 118 and 119 are retracted in their respective control cylinders.

The fluid pressure supply for the chest and the operation of the reciprocating motor and main piston 50 in the main cylinder 10 may be provided through a duct 180, which may be connected to a fluid pressure supply pipe 181 connected into the side or other suitable portion of the chest 60.

The types of bolts and structures and ducts shown in the drawings may be substituted for any type of tappings and tubes for effectively connecting the essential parts described without departing from the scope of this invention. For example, the control cylinders 80 and 81 and their piston guides 88 and 89 may be separate pieces of material instead of being drilled out of a valve chest housing block as shown herein.

II. OPERATION OF THE VALVE CONTROL MECHANISM

Referring first to the positions shown in Figs. 1 and 2, the main motor piston 50 is shown toward the left end of the main motor cylinder. For the purpose of describing this operation let us assume that this piston has just been pushed to this end from the right end of the cylinder by pressure in the chamber 11 which has been introduced through the intake duct 181 into chamber 65 and thence through the uncovered port 18 of the D-valve mechanism and through ducts 23 and 31 into the chamber 11. As soon as the piston 50 reaches the position shown in Fig. 2, the opening to the duct 115 at the left end of the cylinder is uncovered so that the pressure from inside the chamber 11 also passes through the ducts 115 and 109 into the small control cylinder 81 of the control piston 101. Thus the fluid pressure in chamber 11, is transmitted to the side of the piston 101 having the larger effective area, since the other side of the piston has an area reduced to end area of piston section 129 and the end of the piston rod 131 inside the chamber 65. Because of the difference in effective areas the control piston 101 is then pushed towards the right from the position shown in Fig. 1.

The control piston 101 on its travel towards the right moves with its piston portion 119, piston rod 131, guide collar 141 and the lever arm 161. During the first part of its movement, the outer end of the lever arm 161 rides over the cam 150 on the opposing control piston rod 130, and falls down on the upper rod surface as shown in Fig. 5, so that the lower edge 167 of lever arm 161 (see Fig. 3) engages the left end of the D-valve 70.

Further movement of the piston 101 then compresses the spring 165 on the piston section 119, so that the lever 161 slides axially along the piston rod 131 into engagement with the shoulder 129. Simultaneously, with this portion of the movement compressing spring 165, the cam 151 on the piston 131 raises the lever arm 160, pivoted on the opposing control piston rod 130, above the top surface of the D-valve as shown in Fig. 4. Then the action of the compressed spring 164 on piston section 118 slides the lever arm 160 toward the stop 140, causing the bottom edge 166 of the lever arm 160 to slide over and ride on the top of the D-valve 70, holding the outer end of the lever 160 away from further contact with the cam 151 or with the upper surface of the piston rod 131, thereby preventing the lever arm 160 with its pushing projection 166 from obstructing movement of the D-valve toward the right.

Since the ducts 108 and 114 from the piston chamber 80 are connected to the pressure chamber 11, the control piston 100 maintains the D-valve in the position shown in Fig. 1 during the entire stroke of the motor piston 50 from the right to the left. Therefore it is necessary for the action of the cam 151 on the rod 130 of the control piston 101 to lift the lever 160 from the end of the D-valve 70 as shown in Fig. 4, so that the pressure operating on control piston 101 moving it towards the right will not be stopped by an equal counterpressure in the control cylinder 80 upon the control piston 100.

Now further movement of the piston 101 toward the right slides the D-valve 70 into the position shown in Fig. 6 at the right end of its recess 14, with the lever arm 160 still riding on the top of the D-valve 70. Since the position shown in Fig. 6 is to the right of the central position for the spring 72 acting against the top of the D-valve, the spring 72 will now be on the other side of its center position and aid in maintaining the D-valve 70 in the position shown in Fig. 6 until it is again to be pushed back into the position shown in Fig. 1 by later operation of the control piston 130 and its lever arm 160.

Before the lever arm 160 can be operated to push the D-valve 70 back to the left, it must be retracted to the right beyond the right end of the D-valve. This is accomplished as soon as the chamber 11, behind the motor piston 50 in the main motor cylinder, is connected by the D-valve through the ducts 31 and 23 and chamber 75 to the exhaust port 17 and duct 22. Thus the pressure which has now built up in the chamber 11 is exhausted and the pressure of the fluid in the chamber 65 is now permitted to flow through port 16 and ducts 21 and 36 to the left side of the motor piston 50 pushing the motor piston back to its right end position. This is the case when the D-valve is in the position shown in Fig. 6. Thus, as soon as the exhaust is connected to the control cylinder 80 through the ducts 108 and 114 and chamber 11, and then through ducts 31 and 23 and D-valve chamber 75 to exhaust ducts 22 and 25, the pressure within the chamber 80 is reduced materially less than that within the chamber 65 so that the pressure on the shoulder 128 and the end of control piston 130 through slot 132 will move the control piston 100 from the position shown in Fig. 1 back to its extreme right end of the control cylinder 80, corresponding to the position of control piston 101 in Fig. 1. This movement also retracts the lever 160 against collar 140. This retraction of the cylinder 100 takes place during the last part of the movement of the main motor piston 50 from the position shown in Fig. 2 to the dotted line position 190 at the right end of the motor cylinder.

Now the same cycle described above for control piston 101 can take place for the control piston 100, to move the motor piston back to the left end of the motor cylinder as shown in full lines in Fig. 2. Thus for each reciprocation of the piston 50 in the cylinder chamber 11, there is a movement of one of the control pistons 100 or 101 in one direction, and the movement of the other control piston 101 or 100 in the opposite direction, and each of the control pistons 101 and 100 are set for the next operation at the end of each stroke of the motor piston.

III. APPLICATIONS

Fig. 7 shows a pressure lubricating type system employing a reciprocating motor of the type shown in Figs. 1 through 6 with a control mechanism according to this invention in a fluid control chest 60. The motor and valve control assembly is shown mounted on a suitable bracket 200, which bracket is connected to a plunger type pump 201 which may be inserted into a container or drum 202 of a suitable grease or other fluid 203. The end of the piston rod 52 may be removably connected at 205 to the end of a pump piston rod 206, so that the whole motor and valve assembly may be readily removed from the pump 201 and bracket 200; the bracket 200 being attached to the apertures 41 in flanges 40 by suitable fastening means, such as bolts 207.

The constant pressure on the motor piston 50 in the motor cylinder 10, thus applies a constant pressure on the fluid being pumped from the container 202 at the outlet port 210 of the pump 201. This port may be connected, as shown, through a suitable pressure hose 211 to a grease gun 212, which gun is operated by a suitable valve or trigger 214. As soon as the trigger 214 is opened, pressure is relieved on the fluid from port 210 and the constant pressure being applied by the motor mechanism 10 and piston 50 will immediately force more fluid 203 from the container 202 through the pump 201 out through port 210 and the hose 211 through the nozzle 215 of the gun 212.

Although the particular system just described is adapted for being operated by compressed air, it can readily be seen that the control valve mechanism of this invention may also be used in co-operation with other fluids, such as steam or even liquids, without departing from the scope of this invention.

The type of reciprocating motor and control valve mechanism of this invention may also be adapted for pumping other fluids besides grease, whether viscous as plastic filling materials, or non-viscous, in that the operation of the control valve mechanism is adapted for reciprocations as slow as anywhere from about one a minute, or even less, up to a speed of about one a second or more. One of the important advantages of the valve control mechanism of this invention is that this mechanism is entirely automatic, and will give a continuous constant pressure on the end of the reciprocating motor piston at all times regardless of the position of the motor piston along its stroke and not get locked on dead center or have to be manually moved at any time.

While there is described above the principles of this invention in connection with specific apparatus it is to be clearly understood that this description is made only by way of example and not as a limitation to the scope of this invention.

What is claimed is:

1. A valve mechanism for controlling reciprocations of an expansible chamber motor comprising: a valve chest, a reciprocating valve movable between two positions in said chest, a pair of pressure operated reciprocating parallel pistons in said chest, each piston corresponding and being controlled by a different direction of reciprocation of said motor, pivoted arm means on each said piston for engagement with said valve to effect its movement from one of its positions to the other, and cam means on each said piston to remove the engagement of one of said arm means of one piston with said valve when the other piston is shifted to move the other arm means into engagement with said valve.

2. A distributing valve mechanism for controlling reciprocations of an expansible chamber motor, comprising: a pressure fluid valve chest, a sliding valve having two positions in said chest, a pair of fluid pressure operated reciprocating parallel pistons in said chest, each piston controlling a different direction of reciprocation of said motor, piston rods connected to each of said pistons, a pivoted pusher arm mounted on each said piston rod for engagement with opposite ends in said valve, and cam means on each of said piston rods to disengage the arm on the other piston from the end of said valve when said one piston is moved into engagement with said valve for sliding the same.

3. The valve mechanism of claim 2 wherein the motor has an expansible chamber and said pistons are controlled by the pressure of the fluid operating said motor through ducts communicating with the expansible chamber of said motor.

4. A mechanism according to claim 2 including means for maintaining said valve in one position until one of said arms engages it to slide it to its other position.

5. A valve mechanism according to claim 4 wherein said means for maintaining said valve in one position comprises a resilient means acting between said valve and the inside of said chest.

6. A valve mechanism according to claim 2 wherein said pivoted pusher arms are axially slidable along said piston rods between fixed limits on said rods.

7. The valve mechanism according to claim 6 including means on each piston rod to urge said pivoted lever arms towards one of said stop limits.

8. A valve mechanism according to claim 6 wherein said fixed limits comprise a collar spaced from a shoulder along each said piston rod.

9. A valve mechanism according to claim 8 wherein said collars are provided with guide means to prevent the rotation of said piston rods when said lever pusher arms are pivoted on said piston rods.

10. In an expansible chamber motor having a reciprocating motor piston in a motor cylinder and a fluid pressure valve chest containing a sliding D-valve for controlling the operation of said piston, an automotive D-valve operating mechanism comprising: a pair of parallel reciprocating control pistons in a pair of control cylinders and control piston rods connected to said control pistons and mounted in said chest, a pivoted D-valve pushing lever mounted on each control piston rod, a cam on each said rod contacted by the lever pivoted to the other said rod, resilient means to push said levers out of pushing contact with said D-valve when lifted by the cam means of the other said rod thereby releasing the D-valve for movement by the lever of said other piston rod, and means to operate alternately said control piston rods at each end of the stroke of said piston including ducts connecting said control cylinders to said motor cylinder, which ducts are opened and closed by said motor piston.

11. A distributing valve mechanism for controlling the reciprocations of a piston in a cylinder of an expansible chamber motor, comprising: a fluid pressure valve chest, a D-valve slidable in said chest between two limited positions, a pair of fluid pressure operated reciprocating parallel control pistons with piston rods mounted in said chest on each side of said D-valve mechanism, each control piston rod in said chest being provided with a lever arm pivotally mounted thereon for engagement with one end of said D-valve, whereby the operation of one of the control pistons slides said D-valve in one direction and the operation of the other control piston slides the D-valve in the other direction, and cam means mounted on each control piston rod for disengaging said lever arm mounted on the other control piston rod when the lever arm on said one control piston rod is pushing the D-valve.

References Cited in the file of this patent

UNITED STATES PATENTS

| Number | Name | Date |
|---|---|---|
| 469,695 | Griffin | Mar. 1, 1892 |
| 481,520 | Bartholomew | Aug. 23, 1892 |
| 733,985 | Lundquist | July 21, 1903 |
| 2,072,325 | Woodcock | Mar. 2, 1937 |